United States Patent
Amberg et al.

(10) Patent No.: US 9,563,658 B2
(45) Date of Patent: *Feb. 7, 2017

(54) HARDWARE IMPLEMENTATION OF THE AGGREGATION/GROUP BY OPERATION: HASH-TABLE METHOD

(75) Inventors: Philip Amberg, San Jose, CA (US); Justin Schauer, San Francisco, CA (US); Robert David Hopkins, Foster City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/590,057

(22) Filed: Aug. 20, 2012

(65) Prior Publication Data

US 2014/0052726 A1 Feb. 20, 2014

(51) Int. Cl.
*G06F 7/00* (2006.01)
*G06F 17/30* (2006.01)

(52) U.S. Cl.
CPC .............................. *G06F 17/30412* (2013.01)

(58) Field of Classification Search
None
See application file for complete search history.

(56) References Cited

U.S. PATENT DOCUMENTS

| | | | |
|---|---|---|---|
| 5,511,190 A | 4/1996 | Sharma et al. | |
| 5,655,080 A | 8/1997 | Dias et al. | |
| 5,706,495 A | 1/1998 | Chadha et al. | |
| 5,884,299 A | 3/1999 | Ramesh | |
| 6,381,601 B1 | 4/2002 | Fujiwara et al. | |
| 6,571,233 B2 | 5/2003 | Beavin et al. | |
| 6,581,055 B1 | 6/2003 | Ziauddin | |
| 6,957,225 B1 | 10/2005 | Zait et al. | |
| 6,996,569 B1 | 2/2006 | Bedell et al. | |
| 7,111,025 B2 | 9/2006 | Finlay et al. | |
| 2001/0037345 A1* | 11/2001 | Kiernan et al. | ............... 707/513 |
| 2002/0032678 A1* | 3/2002 | Cornwell et al. | ................. 707/3 |
| 2002/0120620 A1 | 8/2002 | Chan et al. | |
| 2003/0187858 A1 | 10/2003 | Kirk et al. | |
| 2005/0091256 A1 | 4/2005 | Rathakrishnan et al. | |
| 2006/0116989 A1 | 6/2006 | Bellamkonda et al. | |
| 2008/0114759 A1 | 5/2008 | Yahia et al. | |
| 2008/0183656 A1 | 7/2008 | Perng et al. | |

(Continued)

OTHER PUBLICATIONS

W3Schools.com., "The WHERE Clause", SQL WHERE Clause, Dated 1999, 2 pages.

(Continued)

*Primary Examiner* — Hosain Alam
*Assistant Examiner* — Thu Nga Nguyen
(74) *Attorney, Agent, or Firm* — Hickman Palermo Becker Bingham LLP

(57) ABSTRACT

Techniques are described for performing grouping and aggregation operations. In one embodiment, a request is received to aggregate data grouped by a first column. In response to receiving the request, a group value in a row of a first column is mapped to an address. A pointer is stored for a first group at a first location identified by the address. The pointer identifies a second location of a set of aggregation data for the first group. An aggregate value included in the set of aggregation data is updated based on a value in the row of a second column.

22 Claims, 13 Drawing Sheets

(56) References Cited

U.S. PATENT DOCUMENTS

| | | |
|---|---|---|
| 2008/0189251 A1 | 8/2008 | Branscome |
| 2009/0055350 A1* | 2/2009 | Branish et al. .................. 707/2 |
| 2009/0094193 A1* | 4/2009 | King et al. ........................ 707/2 |
| 2009/0193006 A1 | 7/2009 | Herrnstadt |
| 2009/0216757 A1 | 8/2009 | Sen et al. |
| 2009/0287628 A1 | 11/2009 | Indeck |
| 2009/0287637 A1* | 11/2009 | Day et al. ......................... 707/2 |
| 2009/0313210 A1* | 12/2009 | Bestgen et al. .................. 707/2 |
| 2010/0030728 A1* | 2/2010 | Chakkappen et al. ........... 707/2 |
| 2010/0082705 A1 | 4/2010 | Ramesh et al. |
| 2010/0088315 A1 | 4/2010 | Netz et al. |
| 2010/0161646 A1 | 6/2010 | Ceballos et al. |
| 2010/0306219 A1 | 12/2010 | Sthanikam et al. |
| 2012/0054225 A1 | 3/2012 | Marwah et al. |
| 2012/0166447 A1 | 6/2012 | Nice |
| 2012/0197868 A1* | 8/2012 | Fauser .............. G06F 17/30286 707/714 |
| 2012/0209873 A1 | 8/2012 | He |
| 2014/0052713 A1 | 2/2014 | Schauer et al. |
| 2014/0052743 A1 | 2/2014 | Schauer et al. |

OTHER PUBLICATIONS

Tang, Jianjing et al., "A Smart Optoelectronic Database filter Based on Photonic VLSI Technology", IEEE, Dated 2001, 4 pages.

Amberg, Philip, "Database Query Execution on a RAPID System Using Hardware Accelerators and an ARM Core", dated Jul. 8, 2011, 18 pages.

Afratis, Panagiotis et al., Design and Implementation of a Database Filter for Blast Acceleration, EDAA, Dated 2009, 6 pages.

Bancilhon, Francois, "Design of a Backend Processor for a Data Base Machine", ACM, dated 1980, 8 pages.

Zhou, Jingren, "Implementing Database Operations Using SIMD Instructions", ACM, dated 2002, 12 pages.

U.S. Appl. No. 13/590,110, filed Aug. 20, 2012, Office Action, Jul. 1, 2014.

Anonymous: "Hash Table—Wikipedia, the free encyclopedia", dated Jun. 20, 2012, Retrieved from the internet, retrieved on May 5, 2014.

U.S. Appl. No. 13/590,110, filed Aug. 20, 2012, Final Office Action, Mar. 27, 2015.

Anonymous:, "Hash Table—Wikipedia, the free encyclopedia", dated Jun. 20, 2012, retrieved from the Internet: http://wayback.archive.org/wiki/harshtable, 18 pages.

U.S. Appl. No. 13/590,032, filed Aug. 20, 2012, Final Office Action, Jan. 26, 2015.

U.S. Appl. No. 13/590,032, filed Aug. 20, 2012, Office Action, Jun. 1, 2015.

U.S. Appl. No. 13/590,110, filed Aug. 20, 2012, Office Action, Apr. 14, 2016.

U.S. Appl. No. 13/590,032, filed Aug. 20, 2012, Advisory Action, Apr. 21, 2016.

U.S. Appl. No. 13/590,110, filed Aug. 20, 2012, Notice of Allowance, Aug. 1, 2016.

U.S. Appl. No. 13/590,032, filed Aug. 20, 2016, Office Action, Jul. 8, 2016.

\* cited by examiner

FIG. 7

| SALES TABLE 702 |
|---|
| SALE_ID COLUMN 704 |
| 1 |
| 2 |
| 3 |
| 4 |
| 5 |
| 6 |
| 7 |
| SALESMAN COLUMN 706 |
| Pedro |
| Pedro |
| Alex |
| Michael |
| Alex |
| Alex |
| Pedro |
| CUSTOMER COLUMN 708 |
| Gainsley Corp. |
| Lexau's Lexan |
| Lexau's Lexan |
| Lexau's Lexan |
| Gainsley Corp. |
| Lexau's Lexan |
| Gainsley Corp. |
| AMOUNT COLUMN 710 |
| 400 |
| 200 |
| 150 |
| 350 |
| 600 |
| 650 |
| 470 |

FIG. 8

ACCUMULATOR DATA STRUCTURE
800

| Fields | Size of field |
|---|---|
| value 802 | sizeof(value) |
| aggregate results 804 | $\Sigma$ sizeof(agg result) |
| ptr to next value 806 | sizeof(ptr) |

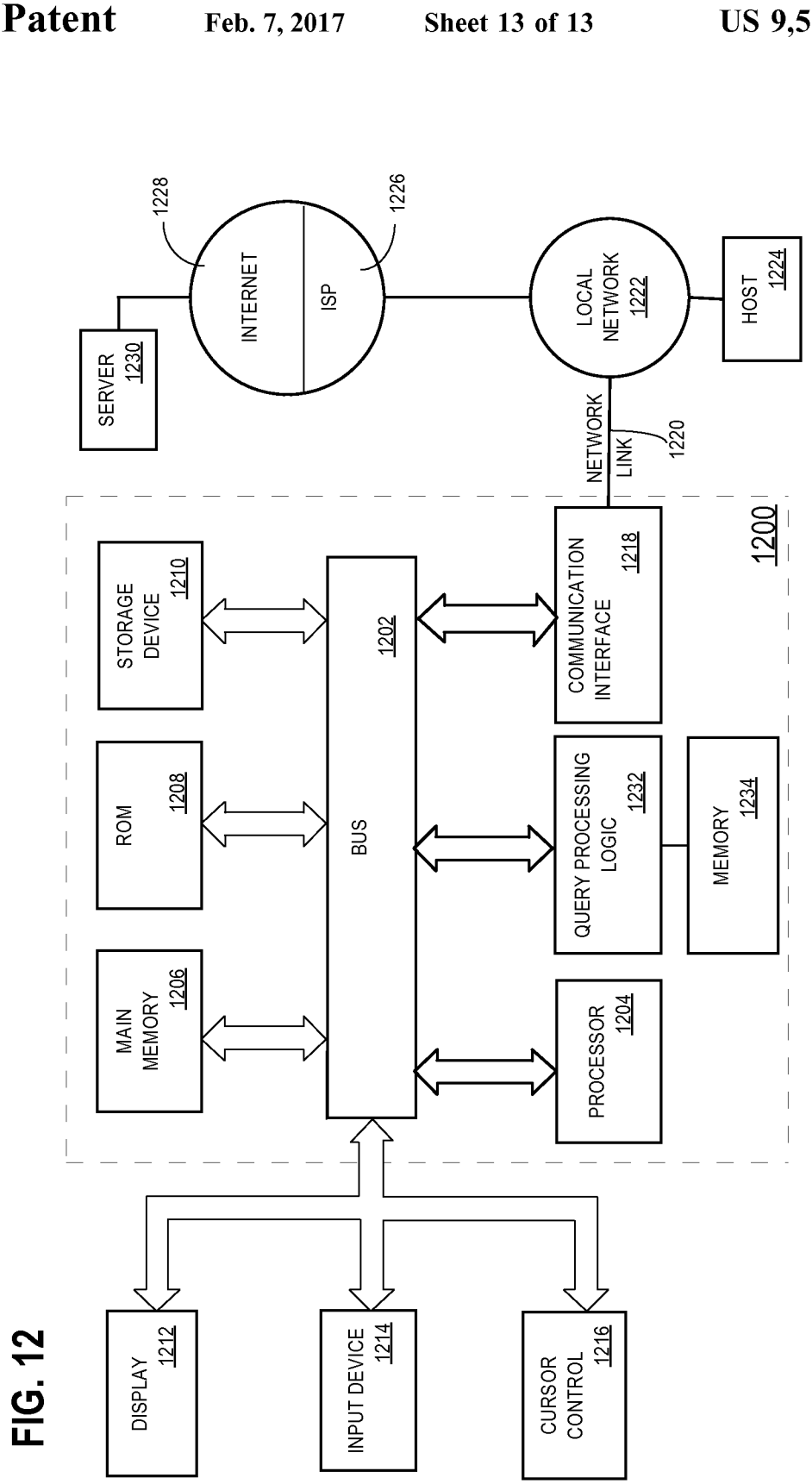

HARDWARE IMPLEMENTATION OF THE AGGREGATION/GROUP BY OPERATION: HASH-TABLE METHOD

CROSS-REFERENCE TO RELATED APPLICATIONS

This application is related to U.S. patent application Ser. No. 13/590,032 entitled "Hardware Implementation of the Filter/Project Operations," filed Aug. 20, 2012, and also to U.S. patent application Ser. No. 13/590,110 entitled "Hardware Implementation of the Aggregation/Group By Operation: Filter Method," filed Aug. 20, 2012, the contents of which are incorporated by reference in their entirety for all purposes as if fully set forth herein.

FIELD OF THE INVENTION

The present disclosure relates generally to techniques for performing database operations and more specifically to techniques for performing grouping and aggregation operations.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A database comprises data and metadata that are stored on one or more storage devices, such as a set of hard disks. The data within a database may be logically organized according to a variety of data models, depending on the implementation. For example, relational database systems typically store data in a set of tables, where each table is organized into a set of rows and columns. In most cases, each row represents a distinct object, and each column represents a distinct attribute. However, other data models may also be used to organize the data.

In order access and manipulate data in a database, a database management system (DBMS) is generally configured to receive and process a variety of database commands, often referred to as queries. In many implementations, the DBMS supports queries that conform to a Data Manipulation Language (DML) such as structured query language (SQL). When the DBMS receives a query, the DBMS performs one or more database operations specified by the query and may output a query result. Example database operations include aggregation and grouping operations, which are described below.

Aggregation and Grouping Operations

Aggregation and grouping operations are database operations that provide summary statistics about data in specific columns. In SQL, grouping operations use the GROUP BY syntax to group results of aggregate functions by one or more columns. Table 1 below illustrates example aggregate functions that may be used in database queries.

TABLE 1

Example aggregate functions

| FUNCTION NAME | DESCRIPTION |
| --- | --- |
| AVG | Returns the average value of a column |

TABLE 1-continued

Example aggregate functions

| FUNCTION NAME | DESCRIPTION |
| --- | --- |
| COUNT | Returns the number of rows in the column |
| FIRST | Returns the first value in the column |
| LAST | Returns the last value in the column |
| MAX | Returns the largest value in the column |
| MIN | Returns the smallest value in the column |
| SUM | Returns the sum of all values in the column |

Example aggregation and grouping queries are shown below in Table 2.

TABLE 2

Example aggregation queries

Query 1:

| SELECT | sum(AMOUNT) |
| --- | --- |
| FROM | sales |

Query 2:

| SELECT | SALESMAN, sum (AMOUNT) |
| --- | --- |
| FROM | sales |
| GROUP BY | SALESMAN |

Query 3:

| SELECT | SALESMAN, CUSTOMER, sum (AMOUNT) |
| --- | --- |
| FROM | sales |
| GROUP BY | SALESMAN, CUSTOMER |

Each of the above queries, when executed by the DBMS, aggregates data from values within the AMOUNT column of a sales table. For instance, Table 3 below illustrates an example sales table.

TABLE 3

Example sales table

| SALE_ID | SALESMAN | CUSTOMER | AMOUNT |
| --- | --- | --- | --- |
| 1 | Pedro | Gainsley Corp. | 400 |
| 2 | Pedro | Lexau's Lexan | 200 |
| 3 | Alex | Lexau's Lexan | 150 |
| 4 | Michael | Lexau's Lexan | 350 |
| 5 | Alex | Gainsley Corp. | 600 |
| 6 | Alex | Lexau's Lexan | 650 |
| 7 | Pedro | Gainsley Corp. | 470 |

Query 1 requests the total dollar amount of sales the company has made. When Query 1 is executed, the DBMS performs aggregation but no grouping. The DBMS unconditionally sums all amounts in the sales table to return a final result. Given the example sales table of Table 3, Table 4 below illustrates the expected output of executing Query 1.

TABLE 4

Result table for Query 1
sum (AMOUNT)

2820

Query 2 requests the total dollar amount of sales grouped by the salesman who made the sale. When Query 2 is executed, the DBMS performs both grouping and aggregation. Specifically, the DBMS generates one aggregated result for each unique salesman in the sales table where the result is the total sales by the particular salesman. Given the example sales table of Table 3, Table 5 below illustrates the expected output of executing Query 2.

TABLE 5

Result table for Query 2

| SALESMAN | sum (AMOUNT) |
|---|---|
| Pedro | 1070 |
| Alex | 1400 |
| Michael | 350 |

Query 3 requests the total dollar amount of sales grouped by the salesman and the customer associated with the sale. When Query 3 is executed, the DBMS performs multicolumn grouping and aggregation. In this case there will be one aggregated result for each unique salesman-customer pair, and the aggregated results are the total sales for that particular salesman-customer pair. Given the example sales table of Table 3, Table 6 below illustrates the expected output of executing Query 3.

TABLE 6

Result table for Query 3

| SALESMAN | CUSTOMER | sum (AMOUNT) |
|---|---|---|
| Pedro | Gainsley Corp. | 870 |
| Pedro | Lexau's Lexan | 200 |
| Alex | Gainsley Corp. | 600 |
| Alex | Lexau's Lexan | 800 |
| Michael | Lexau's Lexan | 350 |

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 7 is a block diagram illustrating a layout of a sales table in memory, according to an embodiment;

FIG. 8 is a block diagram of an accumulator data structure, according to an embodiment;

FIG. 12 is a block diagram of a computer system upon which embodiments may be implemented.

DETAILED DESCRIPTION

Figure 1A:
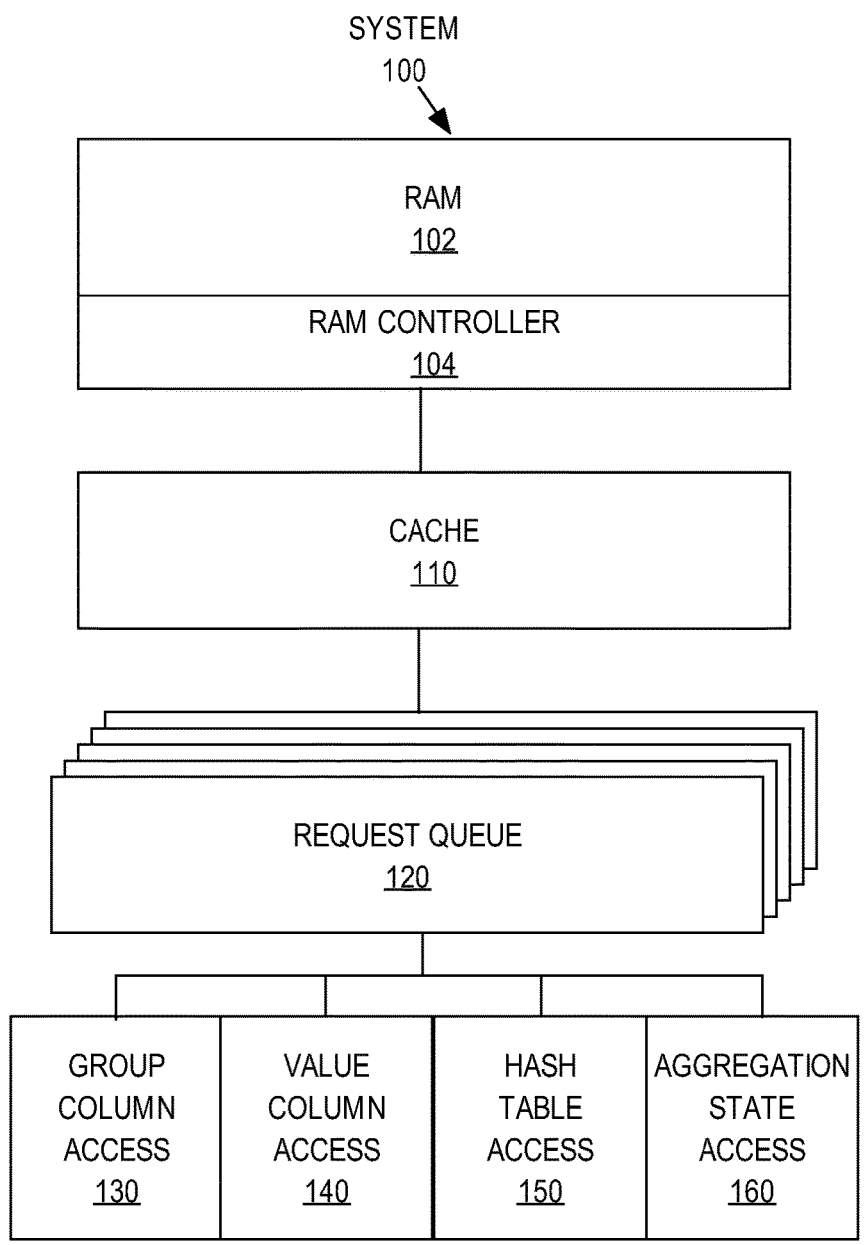
FIGS. 1A and 1B are block diagrams illustrating an example system architecture for performing grouping and aggregation operations, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for performing grouping and aggregation database operations. In an embodiment, specialized hardware is configured to efficiently and effectively perform grouping and aggregation database operations. The specialized hardware may support an arbitrary number of groups when performing grouping operations.

Furthermore, the grouping and aggregation may be performed without a global sort of table data. Avoiding a global sort alleviates random memory access issues that occur while sorting a large list. For example, while sorting a list, one item may go in a group located in one block of memory, while the next item might belong to a group located in a different block of memory. Writing the sorted table in this case would typically require repeatedly closing and opening new memory pages. According to techniques described herein, groupings and aggregations may be performed on small chunks of memory, which allows random accesses to occur in fast, low power caches.

In an embodiment, a system receives a query that requests an aggregation operation grouped by a first column. Because the grouped by operation is performed on the first column, the distinct values in the first column are referred to herein as "group values".

In response to receiving the query, the system maps the group values of the first column to one or more addresses. For example, the system may apply a hash function to each group value to determine an address to which a particular group value maps. Group values that are identical map to the same address, and group values that are different map to different addresses unless a collision occurs.

In an embodiment, each address to which a group value is mapped identifies an entry within a table or content-addressable memory (CAM). The entry may store a pointer that identifies a memory location of a set of aggregation data for the group associated with the group value that hashes to that memory location. For example, if the first column has a value X that hashes to memory location Y, then memory location Y identifies an entry that stores a pointer to aggregation data for rows that have X in the first column.

When a group value of a row maps to the entry, the system may update an aggregate value included in the set of aggregation data for the group. The system may perform the steps of mapping group values and updating the aggregate value for each row of the first column.

In an embodiment, the system may perform collision detection to ensure that two or more different groups do not update the same aggregate value. For example, the set of aggregation data may include the group value in addition to the aggregate value. If a second group value maps to the same address as a first group value, the second group value is checked against the group value stored in the set of aggregate data. If they match, then no collision has occurred and the aggregate value may be updated. However, if the group values do not match, then a collision is detected.

To handle collisions, the set of aggregate data may include a pointer indicating a memory location of aggregate data for a next group. This pointer may initially be set to a null value. When a collision occurs, the pointer may be updated to point to a set of aggregation data for the next group. If subsequent collisions occur after the pointer has been set, then the set of aggregation data for the next group may be retrieved, and the collision detection and handling process may be repeated for the next group.

Example Architecture for Processing Grouping and Aggregation Operations

Figure 1B:
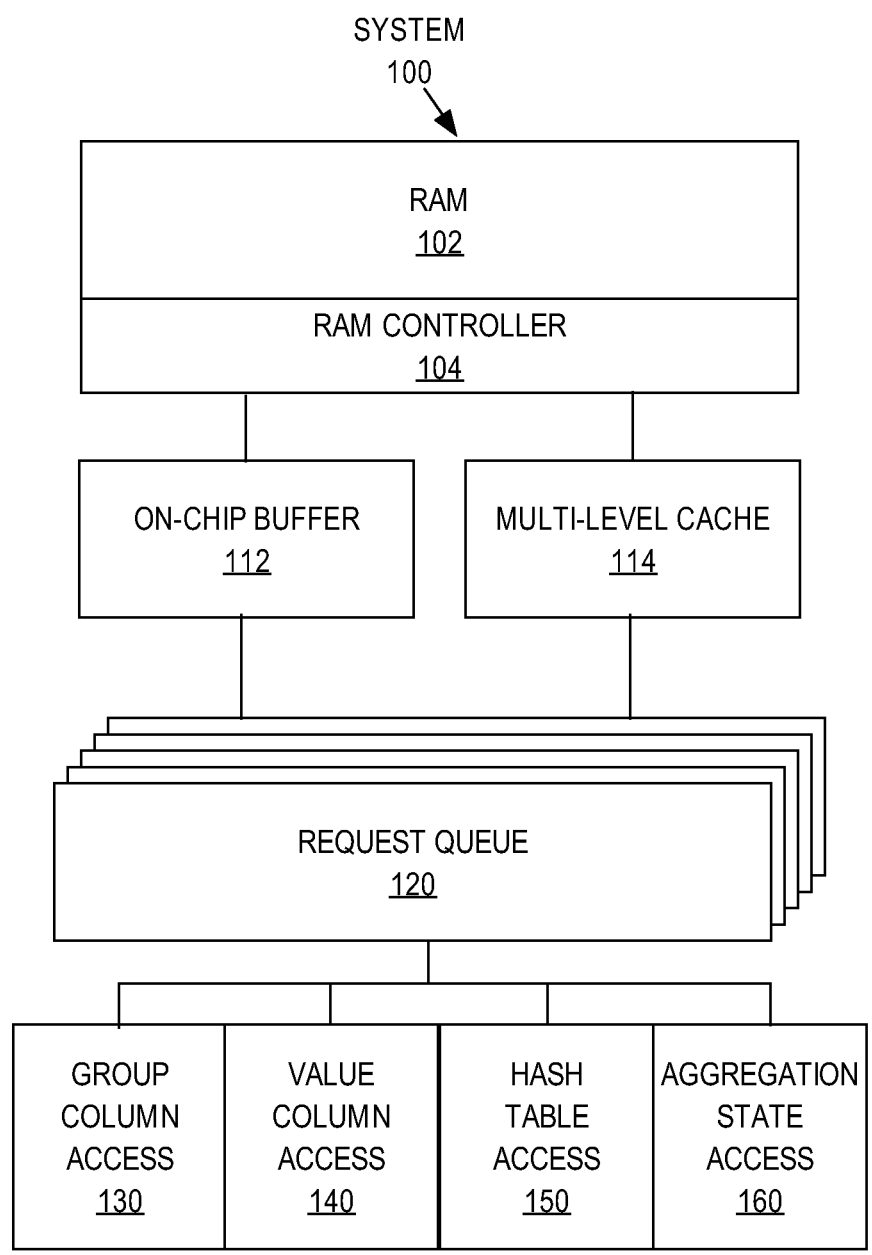

FIGS. 1A and 1B are block diagrams illustrating an example system architecture for performing grouping and aggregation operations, according to an embodiment. System 100 generally comprises Random Access Memory (RAM) 102, RAM controller 104, cache 110, request queue 120, group column access unit 130, value column access unit 140, hash table access unit 150, and aggregation state access unit 160.

RAM 102 may be implemented using any form of data storage that allows random access to the data that it stores. Examples of RAM 102 include without limitation dynamic RAM (DRAM) and static RAM (SRAM). According to an embodiment, RAM 102 stores at least a portion of a database that is queried by a grouping/aggregation database query. The organization of the data stored within RAM 102 may vary from implementation to implementation. In one embodiment, RAM 102 stores the database in a hybrid-columnar format. According to this format, RAM 102 stores N blocks of data, where N may be any positive integer. Within each block, a fixed number of rows for one or more columns are stored in a column-oriented fashion. For example, a first block may store the first 50 rows for one or more columns of a database table, the second block the next 50 rows, and a third block the next 30 rows. Within each block, column values of each column are stored contiguously.

RAM controller 104 is a memory controller that manages the flow of data going to and from RAM 102. Accordingly, RAM controller 104 may process requests from cache 110 or request queue 120 to read and write data to RAM 102. RAM controller 104 may be implemented using any suitable memory controller, including without limitation a double data rate DDR memory controller, a dual-channel memory controller, or a fully buffered memory controller.

Cache 110 stores data that are used by the access blocks during processing of the grouping/aggregation query. Cache memories may allow random access to stored data similar to RAM; however, cache memories are typically smaller in size and have a smaller latency to access data than RAM. Accordingly, caching the data may reduce data bottlenecks and improve performance of system 100, by reducing the number of I/O operations to RAM 102 when processing data for the grouping/aggregation query.

Request queue 120 buffers requests to and from access blocks, including group column access unit 130, value column access unit 140, hash table access unit 150, and aggregation state access unit 160. For example, when a grouping/aggregation query is received, the access blocks may request a particular row or row value from RAM 102 or cache 110. Request queue 120 may buffer a plurality of these requests from the access blocks, which allows memory fetches to be pipelined, sustaining high-bandwidth in case the requested reads result in long-latency RAM accesses.

The access blocks in system 100, including group column access unit 130, value column access unit 140, hash-table access unit 150, and aggregation state access unit 160, are responsible for fetching, updating group accumulators, and writing results back to memory according to techniques described in further detail below.

Memory Organization

The memory system of system 100 may be divided into distinct sections to optimize data access during query processing. FIG. 1B is a block diagram illustrating an example memory hierarchy for system 100. As illustrated, the memory system is divided into two sections: buffer 112 and multilevel cache 114.

Buffer 112 may be implemented as an on-chip buffer and may operate in a non-managed fashion. For instance, buffer 112 may receive a starting memory address and, in response, read data sequentially from RAM 102. In an embodiment, group column access unit 130 and value column access unit 140 access RAM 102 through buffer 112. According to the techniques described below, these blocks read data sequentially and do not perform any modifications on this data. Therefore, data may be efficiently preloaded into buffer 112 since the access pattern is known and sequential.

Multilevel cache 114 is a managed cache that may operate in a similar fashion to a central processing unit (CPU) cache hierarchy, such as a hierarchy that includes a level 1 (L1), level 2 (L2), and level 3 (L3) cache. Accordingly, multilevel cache 114 may comprise smaller, faster, lower-level caches such as a Level 1 (L1) cache that are backed up by larger, slower, higher-level caches.

In an embodiment, hash-table access unit 150 and aggregation state access unit 160 access RAM 102 through multilevel cache 114. When accessing the data that resides in RAM 102 or on disk, these units may search lower-level caches of multi-level cache 114 first, followed by higher-level caches of multi-level cache 114. For instance, the units may first look for the relevant data in the L1 cache, followed by the L2 cache, and then the L3 cache. If the data is not found in any of the cache levels, then the data may be requested from RAM 102. As described in further detail below, hash-table access unit 150 and aggregation state access unit 160 read and modify data randomly, and there may be some degree of spatial and temporal locality to these data accesses. Therefore, a multilevel cache is well-suited to support these units.

Request queue 120 buffers memory access requests received from the access units. In an embodiment, request queue 120 may process requests in the same order that it receives them. For example, request queue 120 may dispatch a request to access memory and wait until the transaction has completed before processing the next request. Alternatively, the request queues that support hash-table access unit 150 and aggregation state access unit 160 may be configured to support out-of-order dispatching. For example, a low-latency access to multilevel cache 114 may be returned before a long-latency access to RAM 102, even if the request to RAM 102 was sent first. Thus, the available hardware resources may be better utilized in the case of slow memory accesses.

Group Column Access Unit

Figure 2:
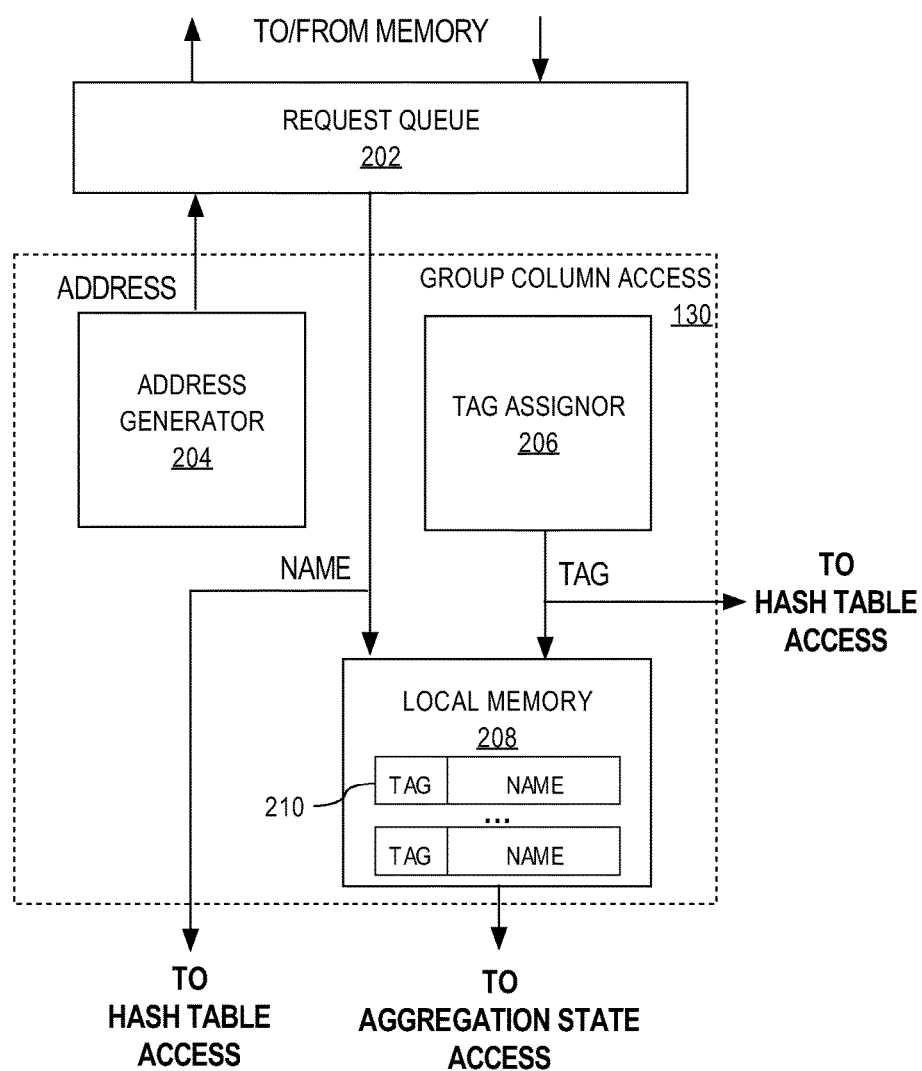
FIG. 2 is a block diagram illustrating an example architecture of a group column access block, according to an embodiment.

FIG. 2 is a block diagram illustrating an example architecture of group column access unit 130. Group column access unit 130 generally comprises address generator 204, tag assignor 206, and local memory 208. Group column access unit 130 is responsible for fetching the values of the column being grouped on. For the purpose of explanation, it shall be assumed that query 2 is being executed. In query 2, the column being grouped on is SALESMAN. Therefore, in the present example, group column access unit 130 is responsible for fetching values from the SALESMAN column.

Address generator 204 generates memory addresses for the columns being grouped on and sends the addresses to memory request queue 202. In an embodiment, address generator 204 begins at the starting address of the group by column. Thus, in the present example, address generator 204 would send the starting address of the SALESMAN column to request queue 202.

In FIG. 2, the requests issued by address generator 204 are shown as being sent "to memory". As was explained with reference to FIG. 1, sending the requests to memory may actually involve looking for data in one or more levels of the multi-level cache 114, and retrieving the data from RAM 102 if it does not reside in the multi-level cache 114. However, for the purposes of explanation, it shall be said that the requests are simply sent to "the memory system", and the requested data is received by the group column access unit 130 from "the memory system".

Thus, in response to the addresses generated by address generator 204, the memory system returns the group names sequentially row by row from the group by column (e.g. SALESMAN). Request queue 202 stores those group names in local memory 208. In addition, tag assignor 206 assigns each of the incoming group names a unique tag, which is stored alongside the corresponding name in local memory 208. For instance, in the present example, address generator 204 may submit the address of the start of the SALESMAN COLUMN. In response, "Pedro" is received and stored in local memory 208 along with the tag TAG1. Then address generator 204 submits the address of the next value of the SALESMAN COLUMN. In response "Pedro" is received and stored in local memory 208 along with the tag TAG2. This process may repeat for the remaining rows of the SALESMAN COLUMN.

In an embodiment, the tag that is assigned by tag assignor 206 acts as a row identifier, which may be used to track the corresponding row and associate it with other pieces of data, such as a value, that may arrive later in the aggregation process. Tag assignor 206 may generate the tags in any suitable fashion to uniquely identify the incoming rows. For example, tag assignor may be implemented as a counter that assigns sequential numbers to each incoming group name. Accordingly, the tag may provide a unique identifier to each row, acting as a proxy for a ROWID attribute without the need to issue memory requests to RAM 102 to access the ROWID column. The tag also enables out-of-order processing of data entries and may be used to identify a particular transaction across multiple access blocks.

According to one embodiment, group column access unit 130 sends the incoming group names directly to hash-table access unit 150 for hashing. In addition, the content of the small local memory 208, including the tag and associated group name, is sent to aggregation state access unit 160 where the group names are used in collision checking.

Hash-Table Access Unit

Figure 3:
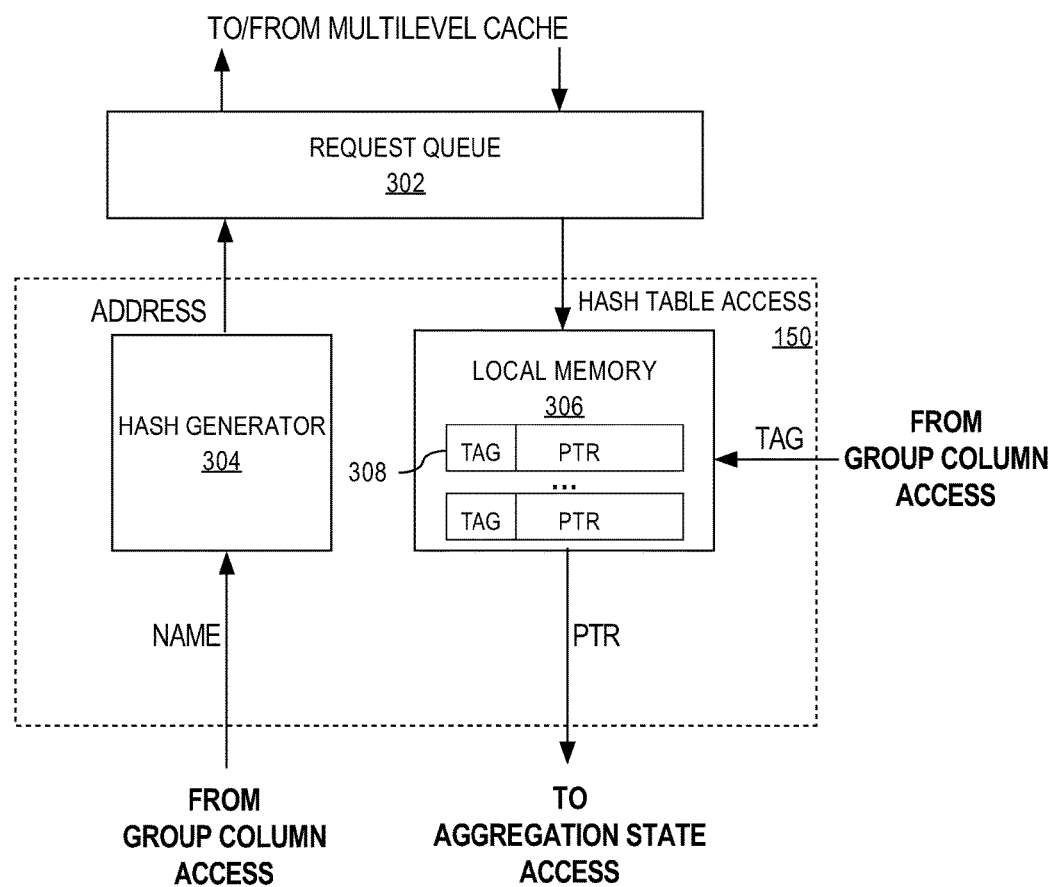
FIG. 3 is a block diagram illustrating an example architecture of a hash-table access block, according to an embodiment.

FIG. 3 is a block diagram illustrating an example architecture of hash-table access unit 150, according to an embodiment. Hash-table access unit 150 generally comprises hash generator 304 and local memory 306. Hash-table access unit 150 is responsible for applying a hash-function to a group name and fetching a corresponding pointer.

Hash generator 304 receives group names, row by row, from group column access unit 130 and applies a hash function to each of the incoming group names. The hash function may be implemented using any suitable function that maps the group name to an address of a hash-table entry. After the hash function has been applied, hash generator 304 sends a memory request to request queue 302 to fetch a pointer from the hash-table entry at the address that corresponds to the hash value generated by the hash function. Request queue 302 fetches the pointer from the local cache (e.g., multilevel cache 114) or RAM 102 and returns the pointer to local memory 306.

The group value that is fed to the hash generator 304 is referred to herein as the "incoming group value". In an embodiment, the hash-table entry stores a NULL pointer if the incoming group value has not been previously encountered. For example, when "Alex" is fed to hash generator 304 for the first time, a hash-table entry with a NULL pointer will be returned.

On the other hand, if the incoming group value has been previously encountered or a hash collision occurs, then the hash-table entry obtained based on the hash value will store a pointer to an "accumulator" data structure. If no collision has occurred, the accumulator data structure is for the incoming group value. In the case of a collision, the accumulator data structure may be for another group that has a group name that hashes to the same hash value as the incoming group value.

The accumulator data structure stores various data for a group and is described in further detail below. Once the memory system returns the pointer, it is stored in local memory 306 along with the tag corresponding to the particular row being processed. The corresponding tag may be received from group column access unit 130. The output of local memory 306, including the tag and corresponding pointer, is sent to aggregation state access unit 160, which fetches payload data at the address indicated by the pointer.

Aggregation State Access Unit

Figure 4:
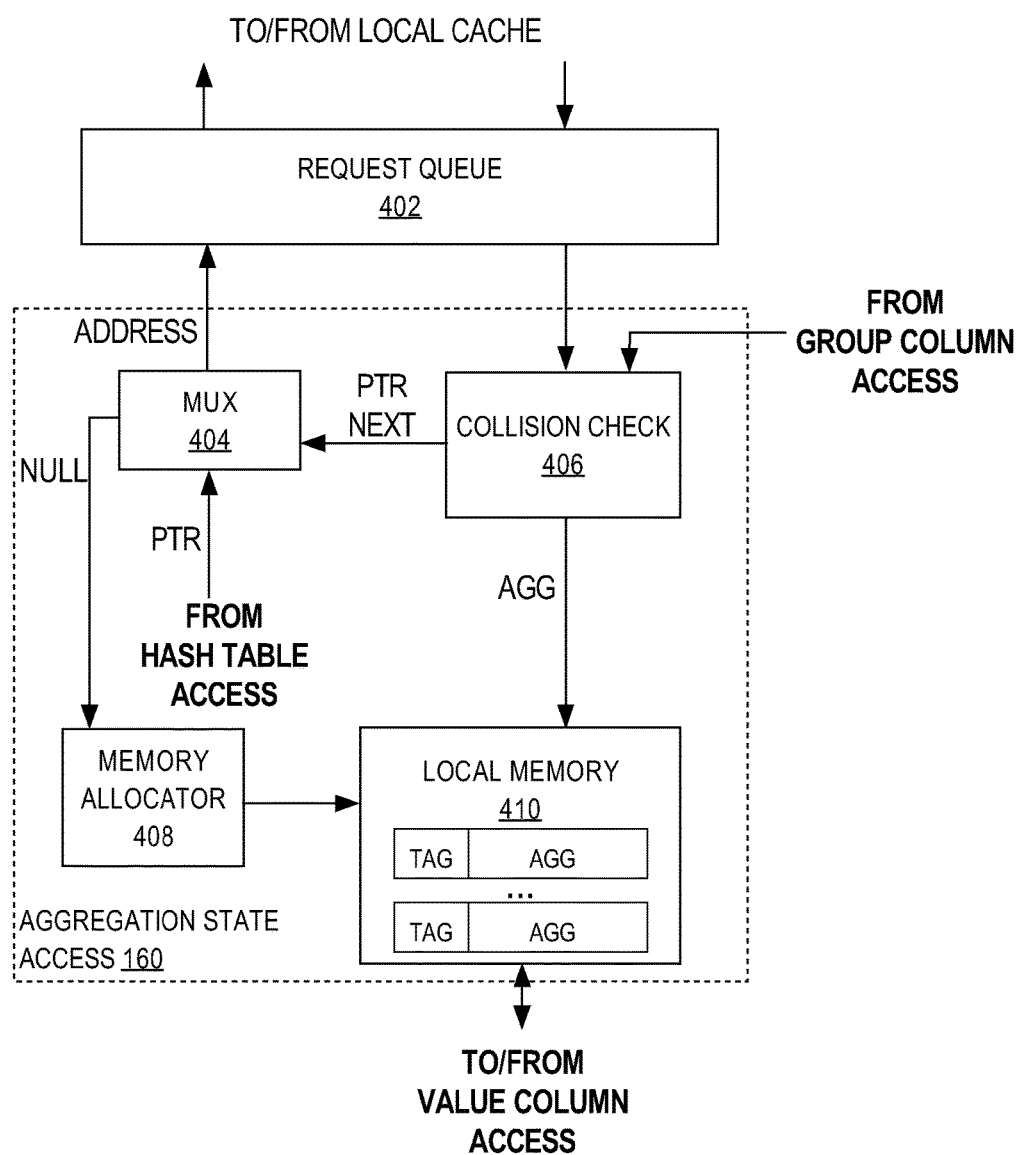
FIG. 4 is a block diagram illustrating an example architecture of a aggregation state access block, according to an embodiment.

FIG. 4 is a block diagram illustrating an example architecture of aggregation state access unit 160, according to an embodiment. Aggregation state access unit 160 generally comprises multiplexer (mux) 404, collision check block 406, memory allocator 408, and local memory 410. Aggregation state access unit 160 is responsible for fetching payload data at the address indicated by a hash-table pointer and performing collision checks on this payload data.

Mux 404 receives a hash-table pointer from hash-table access unit 150. The incoming pointer from hash-table access unit 150 is first checked to determine whether it is a NULL pointer. A NULL pointer indicates that the corresponding group has not yet been encountered and that memory should be allocated to store an accumulator for the group. If the pointer is NULL, then memory allocator 408 allocates memory for this group, initializes fields in a corresponding group accumulator to an initial state, and writes data to local memory 410. The initial aggregate value in local memory 410 for the newly encountered group may remain empty or may be set to zero.

If the pointer is not NULL, mux 404 sends the memory address identified by the pointer to request queue 402 to fetch the payload data. Request queue 402 fetches the payload data through the local cache (e.g., multilevel cache 114) and returns the data to collision check 406. When the local cache delivers this payload, collision check 406 compares the returned group name in the payload data against the group name sent by group column access unit 130. If the group names match, there is no collision and the payload data, including an aggregate value for the group, is written to local memory 410 along with the tag identifying the corresponding row for which collision check transaction took place.

If the group names do not match, then a collision is detected and a pointer to the next payload is extracted from the payload data and is sent back to the NULL check at mux 404 where the same process occurs as before with the new pointer. This process repeats until the pointer to the next payload is NULL, or the returned group name matches the group name sent by group column access unit 130.

The output of local memory cache 410 is sent to value column access unit 140, which updates the accumulator data structure.

Value Column Access Unit

Figure 5:
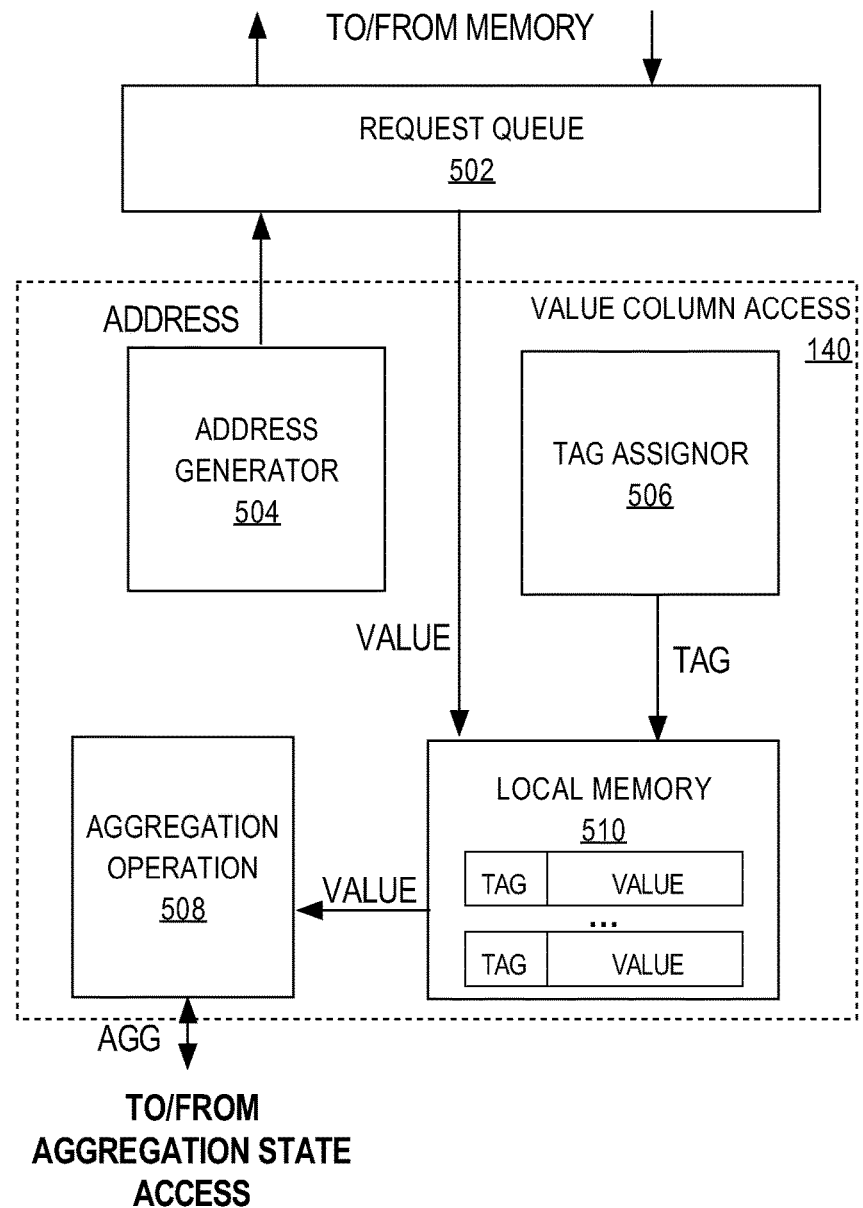
FIG. 5 is a block diagram illustrating an example architecture of a value column access block, according to an embodiment.

FIG. 5 is a block diagram illustrating an example architecture of value column access unit 140, according to an embodiment. Value column access unit 140 generally comprises address generator 504, tag assignor 506, aggregation operation unit 508, and local memory 510. Value column access unit 140 is responsible for fetching the values of the column being aggregated (e.g., the AMOUNT column in the case of query 2).

Similar to group column access unit 130, address generator 504 begins at the starting address of the column and sends the desired addresses to request queue 502. The memory system returns these values row by row. Tag assignor 506 assigns a tag to each row, corresponding to a row identifier, and the result is written to local memory 510. In an embodiment, the tag assigned by tag assignor 506 for a given row matches the tag assigned to the group name read from that given row, so the two pieces of data can be associated with one another when value column access unit 140 aggregates the group data, as described below.

The value from local memory 510, The current accumulator state and corresponding tag from aggregation state access unit 160 are sent to aggregation operation unit 508. The aggregation operation unit 508 uses the tag to retrieve the value with a matching tag from local memory 510. Aggregation operation unit 508 then updates the aggregate value for the group based on the aggregation function specified in the query and the value provided by local memory 510. Aggregation operation unit 508 may perform, without limitation, any of the functions illustrated in Table 1. In the case of query 2, for example, the accumulator data structure for the Pedro group would have a value of 400 after processing the first row. When processing the second row, local memory 510 would provide the value of 200 to aggregation operation unit 508, which would sum this value with 400 to generate a value of 600. The accumulator data structure for the Pedro group would then be updated with this value. After the operation is complete, the updated accumulator is written back to local memory 410 in aggregation state access unit 160, or to the local cache.

Accumulator Data Structure

In one embodiment, system 100 generates and maintains an accumulator data structure for each group that it processes. The accumulator data structure for each group stores a set of aggregation data for the group. The set of data stored in the accumulator data structure may vary, depending on the implementation and the type of aggregation operation being performed.

FIG. 8 is a block diagram of an accumulator data structure, according to an example embodiment. Accumulator data structure 800 includes value field 802, aggregate result field 804, and pointer field 806. In alternative embodiments, accumulator data structure 800 may include more fields or omit one or more of the illustrated fields.

Value field 802 may store any suitable group identifier, such as a group name or any other alphanumeric value. This value may be stored when memory allocator 408 initializes this field to its initial state using the group value from the incoming row.

Aggregate results field 804 stores an aggregate value for the group. Memory allocator 408 may initialize this field to an empty of zero value. This field may then be updated by aggregate operation unit 508 according to the techniques described above. In an embodiment, multiple aggregations can be stored together in this field. For example, for the following query:
SELECT sum(amount), count(*)
FROM sales
GROUP BY salesman
both sum(amount) and count(*) aggregate results can be stored in this single data structure.

Pointer field 806 stores a NULL pointer or a pointer to the accumulator data structure of another group whose group value collided with the group value of the current group. Memory allocator 408 may initialize this field to a NULL value. If a hash collision occurs between the group associated with data structure 800 and a newly encountered group, then an accumulator data structure is created for the newly encountered group, and the pointer field is updated with a pointer to the new accumulator data structure. For example, the pointer may correspond to the memory address of the value field for the newly encountered group.

Out-Of-Order Processing

The tags may be used to enable out-of-order processing of rows during grouping and aggregation. This may be useful when the request queues that support hash-table access unit 150 and aggregation state access unit 160 are configured to support out-of-order dispatching.

For example, when processing the fourth row of the SALESMAN COLUMN, aggregation state access unit 160 may submit a request to fetch payload data for the Michael group. The aggregation state access unit 160 may submit this request to a request queue with a corresponding tag, such as TAG4. The request queue may first try to fetch this data from multilevel cache 114 and, if not found in multilevel cache 114, RAM 102. For purposes of illustration it is assumed that fetching the payload data for Michael results in a long latency RAM access.

While waiting for the payload data for the Michael group to be returned, aggregation state access unit 160 may process the fifth row of the SALESMAN COLUMN. Accordingly, aggregation state access unit 160 submits a request to fetch payload data for the Alex group with the corresponding tag, TAG5 to a request queue. The request queue may then fetch the payload data for this group from multilevel cache 114 and return the payload data and associated tag to aggregation state access unit 160 before the payload data for Michael is returned. This payload data and corresponding tag (TAG 5) are then submitted to value access column unit 140.

In response to receiving this data from aggregation state access unit 160, value column access unit 140 matches TAG5 received from aggregation state access unit 160 with TAG5 stored in local memory 510 to identify the value data that should be used in the aggregation operation. The associated value data is sent to aggregation operation unit 508 to update the aggregate value within the payload data for the Alex group. Thus, the processing of the fifth row may be completed before the processing of the fourth row.

Example Process and Implementation

Figure 6:
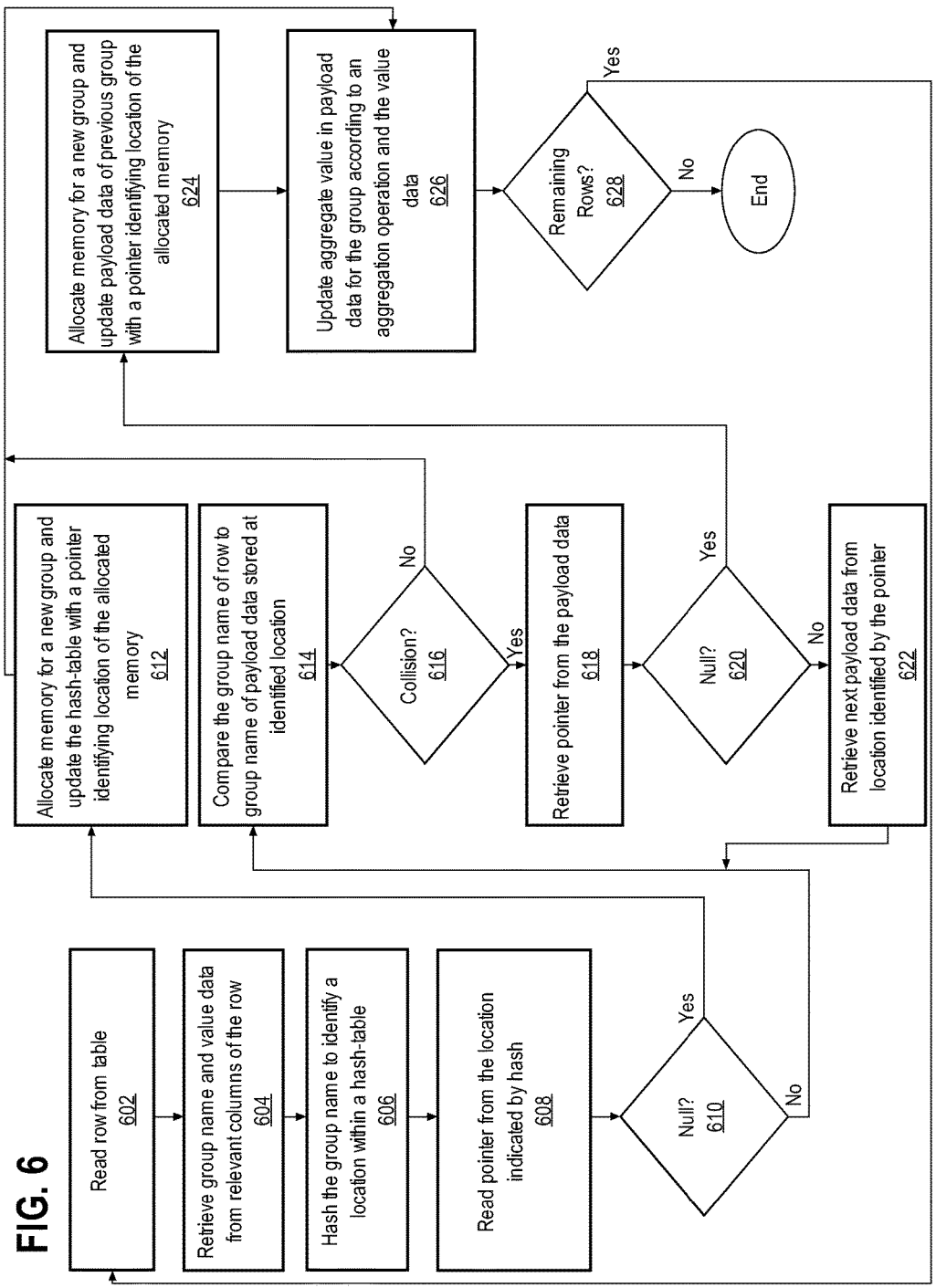
FIG. 6 is a flowchart illustrating an example process for performing grouping and aggregation operations, according to an embodiment.

FIG. 6 illustrates an example process for performing grouping and aggregation operations according to an embodiment. This process may be implemented on any suitable system including, without limitation, system 100.

When a grouping/aggregation query is received, in step 602 a row is read from a table identified by the query. In step 604, the group name and value data are retrieved from the relevant columns of the row. In step 606, the group name is hashed to identify a location within a hash-table or other form of content-addressable memory. In step 608, a pointer is read from the location indicated by the hash. In step 610, it is determined whether the pointer is NULL. If so, then the group has not been encountered yet and at step 612, memory is allocated for a new group, and the hash-table is updated with a pointer identifying the location of the allocated memory. This hash-pointer will be returned for all subsequent rows whose hash produces the same memory address. Thus, if at step 610, it is determined that the pointer is not NULL, then the process continues to step 614.

In step 614, the group name of the incoming row is compared to the group name of the payload data stored at the location identified by the current pointer. In step 616, it is determined whether there is a collision. If the group name of the incoming row matches the group name stored in the payload data identified by the pointer, then there is no collision, and the process continues with step 626. If the group names do not match, then the process continues with step 618. At step 618, the pointer to the next group that has the same hash value is retrieved from the payload data. In step 620, it is determined whether this pointer is NULL. If it is NULL, then the group associated with the current group name has not previously been encountered, and the process continues with step 624. At step 624, memory is allocated for the new group and the payload data retrieved at step 614 is updated to include a pointer identifying the location of the newly allocated memory. If it is determined at step 620 that the pointer is not NULL, then payload data at the location identified by the pointer is retrieved and the process returns to step 614 to repeat the collision check process on this next payload data.

Once a new group is encountered or no collision is detected, then at step 626 the aggregate value in the payload data for the corresponding group is updated according to the aggregation operation and the value data retrieved at step 604.

Figure 9A:
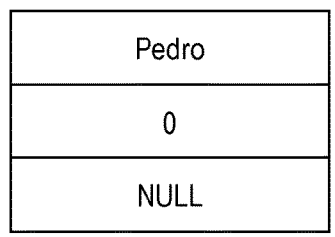
FIGS. 9A-9C are block diagrams of the state of accumulator data structures during grouping and aggregation operations, according to an embodiment.
Figure 9B:
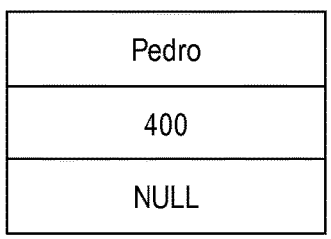
Figure 9C:
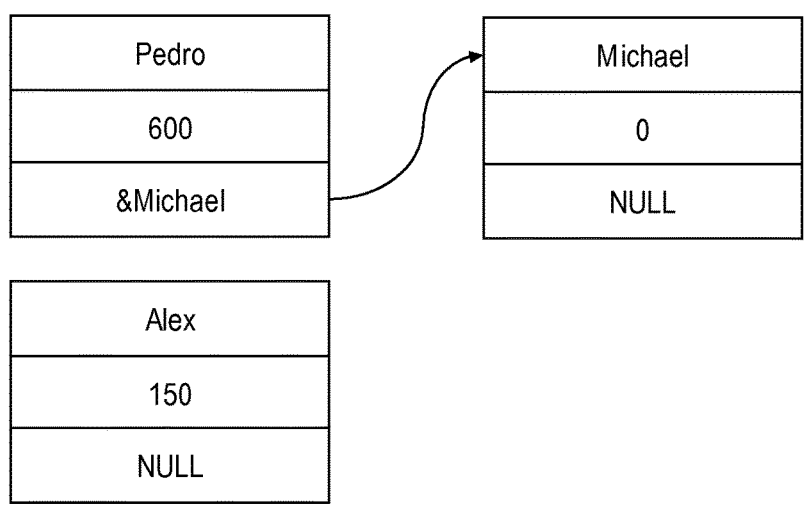
Figure 10:
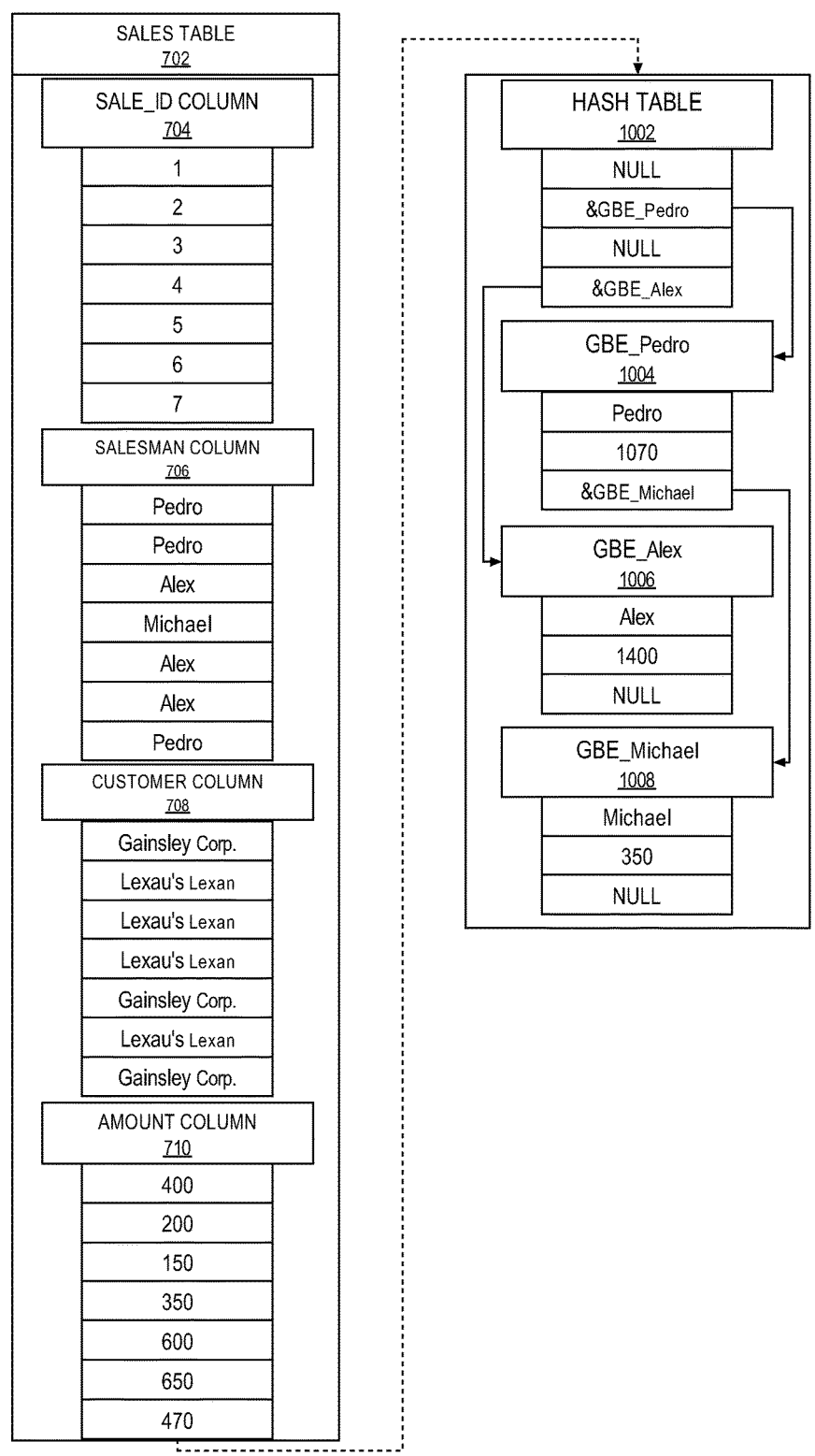
FIG. 10 is a block diagram illustrating the state of a memory after grouping and aggregation operations have been performed, according to an embodiment.

FIGS. 7, 9, and 10 illustrate an example implementation of the process illustrated in FIG. 6. In particular, these figures show various states of system 100 during the processing of query 2 shown in Table 2.

FIG. 7 is a block diagram illustrating a layout of sales table 702 in memory, according to an example implementation. Referring to FIG. 7, SALE_ID column 704, SALESMAN column 706, CUSTOMER column 708, and AMOUNT column 710 are stored in a column-oriented format such that all the rows from a particular column are stored contiguously in memory. In the case of query 2, steps 602 and 604 may comprise group column access unit 130 reading the first entry of SALESMAN column 706 to retrieve the group name "Pedro," and value column access unit 140 reading the first element of AMOUNT column 710 to retrieve value data "400."

The group name "Pedro" is then hashed to produce a memory address where a pointer to the accumulator data structure for this group will be stored. Since two or more unique input values can hash to the same value in some cases, the group name "Pedro" and the corresponding pointer are sent to hash table access unit 150 to check for collisions. Because "Pedro" is the first group processed, aggregation state access unit 160 determines that the pointer is NULL and allocates memory for the Pedro group. In an embodiment, aggregation state access unit 160 generates an accumulator data structure, such as shown in FIG. 8, and initializes each of the fields to a starting state.

FIG. 9A is a block diagram of the state of Pedro accumulator data structure after initialization, according to an embodiment. The value field is initialized to Pedro, corresponding to the group name, and the value of the aggregate result field is initialized to "0". Since there have been no collisions to this address yet, the pointer to the next value is set to NULL.

Once the Pedro accumulator data structure has been initialized, the value of the aggregate results field is read and stored by aggregation state access unit 160. Aggregation state access unit 160 provides the "400" value to aggregation operation unit 508, which adds the value data extracted from the row to the aggregate result value provided by the aggregation state access unit 160. After it has been updated, the aggregate result value is written back to memory. FIG. 9B is a block diagram of the state of the Pedro accumulator data structure after the first row has been processed. Referring to FIG. 9B, the aggregate result field stores the value "400" corresponding to the result of the aggregation operation after processing the first row.

After the accumulator data structure has been updated, the process is repeated for each of the remaining rows in the table. For the second row, the group name is also "Pedro", which hashes to the same address as the first row. Accordingly, aggregation state access unit 160 determines that the Pedro group already exists at this location. The collision check block 406 then compares the group name of the second element, "Pedro" with the group name stored in the accumulator data structure shown in FIG. 9B, which is also "Pedro." The group names are the same; therefore, aggregation state access unit 160 determines that there is no collision. The value of the aggregate results field for the Pedro accumulator data structure is then read into value column access unit 140, which updates the field with the new value (400+200=600) and writes the updated field back to memory.

For purpose of illustration, it is assumed that the hash of "Pedro" and the hash of "Michael" cause a collision in the present example. Thus, the hash function applied by hash-table access unit 150 generates the same memory address for each of these group names. In such a scenario, collision check 406 finds the value stored at this location ("Pedro") is not equal to the incoming row value ("Michael"). Collision check 406 then tries to follow the next value pointer stored at the location to perform the collision check on the next element. In this case, the next value pointer is NULL, meaning no other values exist at this hash location and that this is the first collision at this location. Memory allocator then creates a new data structure for the Michael group and updates the next value in the Pedro group to point to Michael.

FIG. 9C illustrates the state of the accumulator data structures after memory allocator has initialized the values for Michael. As illustrated, the pointer stored in the Pedro accumulator data structure points to Michael. The group name Alex did not cause a collision and is therefore stored separately.

After the Michael accumulator data structure is generated, its aggregate value field is updated according to the process above. This process repeats for the remaining rows in the table to obtain a final aggregate result for each of the groups.

FIG. 10 is a block diagram illustrating the state of a memory at the end of the aggregation process, Hash-table 1002 is a four-entry hash-table. However, the number of entries may vary from implementation to implementation. Hash-table 1002 stores two pointers: one to the Pedro accumulator 1004 and another to the Alex accumulator 1006. Pedro accumulator 1004 stores the aggregate results for Pedro and a pointer to the Michael accumulator 1008. Alex accumulator 1006 stores aggregate results for Alex and Michael accumulator 1008 stores the aggregate results for Michael. The pointers in both these accumulators are NULL indicating that no collision occurred for these groups. The group name and corresponding aggregate result for each of the accumulators may be returned as a result of query 2.

Selecting the Size of the Hash Table

The size of the hash table may vary from implementation to implementation. A smaller hash table is more likely to result in more collisions, which may reduce system performance. Conversely, a large hash table is more likely to waste memory capacity within the system.

Figure 11:
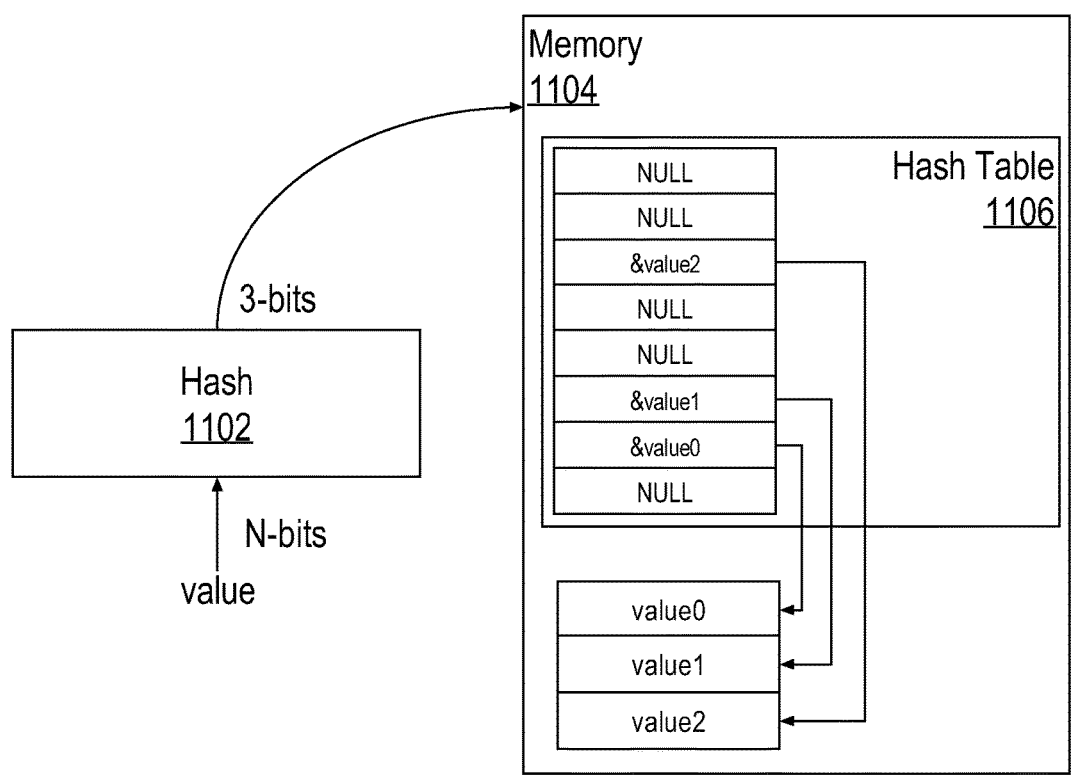
FIG. 11 is a block diagram illustrating an example hash-table structure, according to an embodiment.

For example, FIG. 11 is a block diagram illustrating an example hash-table structure, according to an embodiment. Hash function 1102 is applied to an incoming N-bit value to generate a 3-bit address for hash-table 1106, which is stored in memory 1104. Accordingly, there are eight different available hash-table entries within hash-table 1106. As illustrated, hash-table is storing three pointers for three different values. In this case, a smaller 2-bit addressable hash-table would have provided sufficient storage for the three pointers. However, the smaller hash-table would increase the likelihood of collision, especially as more values are received. A larger table such as a 4-bit addressable hash-table would waste storage resources, especially if no new values are received.

In one embodiment, the size of the hash table for a particular query is determined and set based on an estimate of the cardinality of the grouping operation. The more groups that are likely to be in the grouping operation, the more memory is allocated for the hash-table. For example, the value N in an N-bit addressable hash-table may be proportional to the cardinality of the grouping operation. Accordingly, the size of the hash-table may be selected to achieve a satisfactory balance between storage consumption and collision probability.

Hash-Table Collision Handling

The techniques for addressing hash-table collisions may vary from implementation to implementation. As an alternative to the collision-handling techniques described above, system 100 may precompute all group names that will map to the same location in the hash-table. The precomputation may be performed when the database is loaded into system 100. The colliding groups may then be placed in a second table dedicated to these collisions. The entry in the original hash-table may then be replaced with a special key that indicates a collision occurred at that address and that the aggregate data is in the second table.

There are multiple ways to search the second table when a collision is detected. If the number of entries in the second table is small, a linear-search may be effective. The collision-handling algorithm may iterate through each entry in the second table, comparing the desired group name against the group names in the second table. When a match is found, the aggregate value field for this element is returned and updated.

In another embodiment, the search may also be implemented with a second hash-table using a different hash-function. The payload data for this second hash-table may use the full accumulator data structure, as collisions may still occur.

In yet another embodiment, the collision table can be organized in a binary-tree structure. Each node in the binary-tree may store a group name and aggregate value. When the correct node is found, the aggregate value is returned and updated. If the tree is well balanced, the table can be searched in O(log(N)) time.

One advantage to the precomputation approach is that it reduces the size of accumulator data structure 800 since field 802 and field 806 are no longer needed to handle collisions. Therefore, this approach may save storage space over a real-time approach when there are few collisions. However, precomputing the groups may involve more processing overhead than the other approaches described above, especially in the case where there are frequent database updates that produce new groups. In this scenario, many precomputations may need to be performed as the new groups are loaded.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 12 is a block diagram that illustrates a computer system 1200 upon which an embodiment of the invention may be implemented. Computer system 1200 includes a bus 1202 or other communication mechanism for communicating information, and a hardware processor 1204 coupled with bus 1202 for processing information. Hardware processor 1204 may be, for example, a general purpose microprocessor.

Computer system 1200 also includes a main memory 1206, such as a random access memory (RAM) or other dynamic storage device, coupled to bus 1202 for storing information and instructions to be executed by processor 1204. For example, RAM 102 may be implemented in main memory 1206. Main memory 1206 also may be used for storing temporary variables or other intermediate information during execution of instructions to be executed by processor 1204. Such instructions, when stored in non-transitory storage media accessible to processor 1204, render computer system 1200 into a special-purpose machine that is customized to perform the operations specified in the instructions.

Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may also include query processing logic 1232 for performing filter, project, grouping, and/or aggregation operations. Query processing logic 1232 may be configured to executed the process illustrated in FIG. 6 and may be implemented using any suitable hardware, such as the access units of system 100. Query processing logic 1232 is coupled to memory 1234, which caches data used and generated during the query processing operations. For example cache 110 may be implemented in memory 1234.

Computer system 1200 may implement the techniques described herein using customized hard-wired logic, one or more ASICs or FPGAs, firmware and/or program logic which in combination with the computer system causes or programs computer system 1200 to be a special-purpose machine. According to one embodiment, the techniques herein are performed by computer system 1200 in response to processor 1204 executing one or more sequences of one or more instructions contained in main memory 1206. Such instructions may be read into main memory 1206 from another storage medium, such as storage device 1210. Execution of the sequences of instructions contained in main memory 1206 causes processor 1204 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1210. Volatile media includes dynamic memory, such as main memory 1206. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1202. Transmission media can also take the form of acoustic or light waves, such as those generated during radio-wave and infra-red data communications.

Various forms of media may be involved in carrying one or more sequences of one or more instructions to processor 1204 for execution. For example, the instructions may initially be carried on a magnetic disk or solid state drive of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card, cable modem, satellite modem, or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams. The signals through the various networks and the signals on network link 1220 and through communication interface 1218, which carry the digital data to and from computer system 1200, are example forms of transmission media.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218.

The received code may be executed by processor 1204 as it is received, and/or stored in storage device 1210, or other non-volatile storage for later execution.

Extensions and Alternatives

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   receiving a request to aggregate data grouped by a first column;
   in response to receiving the request, performing, for each row of a plurality of rows:
   retrieving, using hardware of a group column access unit, a value from the first column of the row;

wherein the value from the first column of the row is a group value for the row;

mapping, using hardware of a hash table access unit, the group value for the row to an address;

retrieving from memory associated with the address, using hardware of an aggregation state access unit, a set of aggregation data for a group associated with the group value; and updating, using hardware of a value column access unit, an aggregate value included in the set of aggregation data based on a value in a second column of the row;

wherein the group column access unit, the hash table access unit, the aggregation state access unit and the value column access unit are separate and distinct hardware units;

wherein the group column access unit, the hash table access unit, the aggregation state access unit, and the value column access unit each have a separate and distinct local memory;

wherein the method is performed by one or more computing devices.

2. The method of claim 1, further comprising:

for a particular row of the plurality of rows, determining that aggregation data for the group value associated with the particular row has not yet been generated;

in response to determining that the aggregation data for the group value associated with the particular row has not yet been generated, allocating memory to store aggregation data for the group value associated with the particular row.

3. The method of claim 1, wherein for at least two rows of the plurality of rows, different group values map to a same address, the method further comprising:

for a particular group value, from a particular row of the plurality of rows, that maps to the same address:

using the same address to locate a particular set of aggregation data that includes a stored group value;

comparing the stored group value to the particular group value;

in response to determining that the stored group value and the particular group value match, updating an aggregate value included in the set of aggregation data based on a second value from the particular row of the second column.

4. The method of claim 3, further comprising:

in response to determining that the stored group value and the particular group value do not match:

allocating memory to store aggregation data for a new group;

generating a pointer that identifies an address of the allocated memory;

storing the pointer in the particular set of aggregation data.

5. The method of claim 1 wherein mapping the group value to an address comprises applying a hash function to the group value.

6. The method of claim 1, wherein the set of aggregation data for the group includes the group value, the aggregate value, and a pointer to a second set of aggregation data for a colliding group.

7. The method of claim 1, wherein the address is stored in a hash-table; wherein the size of the hash-table is selected based on an estimate of a number of groups associated with the request to aggregate data.

8. The method of claim 1, wherein collisions are detected by precomputing all group names in the first column that map to a same address before the request is received.

9. One or more non-transitory computer-readable media storing instructions, which, when executed by one or more processors, cause one or more computing devices to perform:

receiving a request to aggregate data grouped by a first column;

in response to receiving the request, performing, for each row of a plurality of rows:

retrieving, using hardware of a group column access unit, a value from the first column of the row;

wherein the value from the first column of the row is a group value for the row;

mapping, using hardware of a hash table access unit, the group value for the row to an address;

retrieving from memory associated with the address, using hardware of an aggregation state access unit, a set of aggregation data for a group associated with the group value; and updating, using hardware of a value column access unit, an aggregate value included in the set of aggregation data based on a value in a second column of the row;

wherein the group column access unit, the hash table access unit, the aggregation state access unit and the value column access unit are separate and distinct hardware units;

wherein the group column access unit, the hash table access unit, the aggregation state access unit, and the value column access unit each have a separate and distinct local memory.

10. The non-transitory computer-readable media of claim 9, further storing instructions causing the one or more computing devices to perform:

for a particular row of the plurality of rows, determining that aggregation data for the group value associated with the particular row has not yet been generated;

in response to determining that the aggregation data for the group value associated with the particular row has not yet been generated, allocating memory to store aggregation data for the group value associated with the particular row.

11. The non-transitory computer-readable media of claim 9, wherein for at least two rows of the plurality of rows, different group values map to a same address, the non-transitory computer-readable media further storing instructions causing the one or more computing devices to perform:

for a particular group value, from a particular row of the plurality of rows, that maps to the same address:

using the same address to locate a particular set of aggregation data that includes a stored group value;

comparing the stored group value to the particular group value;

in response to determining that the stored group value and the particular group value match, updating an aggregate value included in the set of aggregation data based on a second value from the particular row of the second column.

12. The non-transitory computer-readable media of claim 11, further storing instructions causing the one or more computing devices to perform, for a second row of the first column:

allocating memory to store aggregation data for a new group;

generating a pointer that identifies an address of the allocated memory;

storing the pointer in the particular set of aggregation data.

13. The non-transitory computer-readable media of claim 9, wherein instructions for mapping the group value to an address comprise instructions for applying a hash function to the group value.

14. The non-transitory computer-readable media of claim 9, wherein the set of aggregation data for the group includes the group value, the aggregate value, and a pointer to a second set of aggregation data for a colliding group.

15. The non-transitory computer-readable media of claim 9, wherein the address is stored in a hash-table; wherein the size of the hash-table is selected based on an estimate of a number of groups associated with the request to aggregate data.

16. The non-transitory computer-readable media of claim 9, wherein collisions are detected by precomputing all group names in the first column that map to a same address before the request is received.

17. A system for performing grouping and aggregation operations comprising:
one or more processors;
one or more non-transitory computer-readable media storing instructions, which, when executed by the one or more processors cause:
hardware of a group column access unit to retrieve a group value for a first group from a row of a first column;
hardware of a hash table access unit to map the group value to an address;
hardware of an aggregation state access unit to retrieve aggregation data identified by a pointer stored at the address for the first group;
hardware of a value column access unit to update an aggregate value included in the aggregation data based on a value in the row of a second column;
wherein the group column access unit, the hash table access unit, the aggregation state access unit, and the value column access unit are separate and distinct hardware units;
wherein the group column access unit, the hash table access unit, the aggregation state access unit, and the value column access unit each have a separate and distinct local memory.

18. The system of claim 17, wherein the instructions further cause hardware of the aggregation state access unit to:
determine that the pointer for the first group has not yet been generated;
in response to determining that the pointer for the first group has not yet been generated, allocate memory to store the aggregation data for the first group;
generate the pointer for the first group;
wherein the pointer for the first group identifies an address of the allocated memory.

19. The system of claim 17, wherein the instructions further cause:
hardware of the hash table access unit to map a second group value stored in a second row to a second address;
hardware of the aggregation state access unit to retrieve aggregation data identified by a second pointer stored at the second address for a second group;
hardware of the value column access unit to update an aggregate value in the aggregation data identified by the second pointer based on a value in the second row of the second column.

20. The system of claim 17, wherein the instructions further cause:
hardware of the hash table access unit to map a second group value in a second row of the first column to the address;
hardware of the aggregation state access unit to compare the group value to the second group value and in response to determining that the group value and the second group value match, updating the aggregate value in the aggregation data based on a second value in the second row of the second column.

21. The system of claim 20, wherein in response to determining that the group value and the second group value do not match: the instructions further cause hardware of the aggregation state access unit to:
allocate memory to store aggregation data for a second group;
generate a second pointer that identifies an address of the allocated memory;
store the second pointer in the aggregation data for the first group.

22. The system of claim 17 wherein the instructions further cause hardware of the hash-table access unit to apply a hash function to the group value to map the group value to the address.

* * * * *

UNITED STATES PATENT AND TRADEMARK OFFICE
CERTIFICATE OF CORRECTION

PATENT NO.         : 9,563,658 B2                     Page 1 of 1
APPLICATION NO.    : 13/590057
DATED              : February 7, 2017
INVENTOR(S)        : Amberg et al.

It is certified that error appears in the above-identified patent and that said Letters Patent is hereby corrected as shown below:

On the Title Page

On page 2, Column 2, under Other Publications, Line 16, delete "/harshtable," and insert -- /hashtable, --, therefor.

In the Specification

In Column 9, Line 34, delete "The current" and insert -- the current --, therefor.

Signed and Sealed this
Fifteenth Day of August, 2017

Joseph Matal
*Performing the Functions and Duties of the*
*Under Secretary of Commerce for Intellectual Property and*
*Director of the United States Patent and Trademark Office*